United States Patent

Miura et al.

[11] Patent Number: 6,100,895
[45] Date of Patent: Aug. 8, 2000

[54] APPARATUS AND METHOD OF IMAGE SYNTHESIZATION

[75] Inventors: Katsuhiro Miura, Ichikawa; Takashi Yokota, Yokohama; Masaki Takeda, Tokyo; Kuniyuki Konishi, Yokohama, all of Japan

[73] Assignee: Namco Ltd., Tokyo, Japan

[21] Appl. No.: 09/255,731

[22] Filed: Feb. 23, 1999

Related U.S. Application Data

[63] Continuation of application No. 08/682,780, filed as application No. PCT/JP95/02442, Nov. 30, 1995, abandoned.

[30] Foreign Application Priority Data

Dec. 1, 1994 [JP] Japan ................................... 6-329706
Dec. 1, 1994 [JP] Japan ................................... 6-329707

[51] Int. Cl.⁷ .................................................. G06F 15/00
[52] U.S. Cl. ..................................................... 345/426
[58] Field of Search ................................ 345/426, 425, 345/427, 419, 112, 118

[56] References Cited

U.S. PATENT DOCUMENTS 5,416,729  5/1995  Leon et al. ............................. 345/419
5,977,978  11/1999  Carey et al. ........................... 345/419

FOREIGN PATENT DOCUMENTS

| 62-186373 | 8/1987 | Japan . |
| 4-127386 | 4/1992 | Japan . |
| 4-112277 | 9/1992 | Japan . |
| 5-265443 | 10/1993 | Japan . |
| 5-303623 | 11/1993 | Japan . |

*Primary Examiner*—Phu K. Nguyen
*Attorney, Agent, or Firm*—Oliff & Berridge PLC

[57] ABSTRACT

A character screen information generating unit (34) has a function also serving as a spotlight information generating unit and outputs spotlight information for brightness toward a brightness information converting unit (30). The brightness information converting unit (30) uses this spotlight information for brightness to convert brightness information. A shading computation unit (24) uses the converted brightness information and color information of an object to determine color information to be displayed on a display at each pixel. A depth cueing computation unit (26) uses depth information to make a depth cueing computation relative to the determined color information. Thus, a pattern such as headlight can be displayed in the form of spotlight. Further, such a spotlight display can reflect by the depth information. There may further be provided a depth information converting unit for converting the depth information by the use of spotlight information for depth.

15 Claims, 14 Drawing Sheets

FIG. 5

COLOR CODE

COLOR PALETTE 0

| | R | G | B |
|---|---|---|---|
| 0 | | | |
| 1 | | | |
| 92 | 170 | 65 | 30 |
| 254 | | | |
| 255 | | | |

COLOR PALETTE 1

| | R | G | B |
|---|---|---|---|
| 0 | | | |
| 1 | | | |
| 92 | 160 | 70 | 40 |
| 254 | | | |
| 255 | | | |

COLOR PALETTE 2

| | R | G | B |
|---|---|---|---|
| 0 | | | |
| 1 | | | |
| 92 | 150 | 75 | 50 |
| 254 | | | |
| 255 | | | |

COLOR PALETTE 3

| | R | G | B |
|---|---|---|---|
| 0 | | | |
| 1 | | | |
| 92 | 140 | 80 | 60 |
| 254 | | | |
| 255 | | | |

COLOR PALETTE 4

| | R | G | B |
|---|---|---|---|
| 0 | | | |
| 1 | | | |
| 92 | 130 | 85 | 70 |
| 254 | | | |
| 255 | | | |

COLOR PALETTE 5

| | R | G | B |
|---|---|---|---|
| 0 | | | |
| 1 | | | |
| 92 | 120 | 90 | 80 |
| 254 | | | |
| 255 | | | |

COLOR PALETTE 6

| | R | G | B |
|---|---|---|---|
| 0 | | | |
| 1 | | | |
| 92 | 110 | 95 | 90 |
| 254 | | | |
| 255 | | | |

COLOR PALETTE 7

| | R | G | B |
|---|---|---|---|
| 0 | | | |
| 1 | | | |
| 92 | 100 | 100 | 100 |
| 254 | | | |
| 255 | | | |

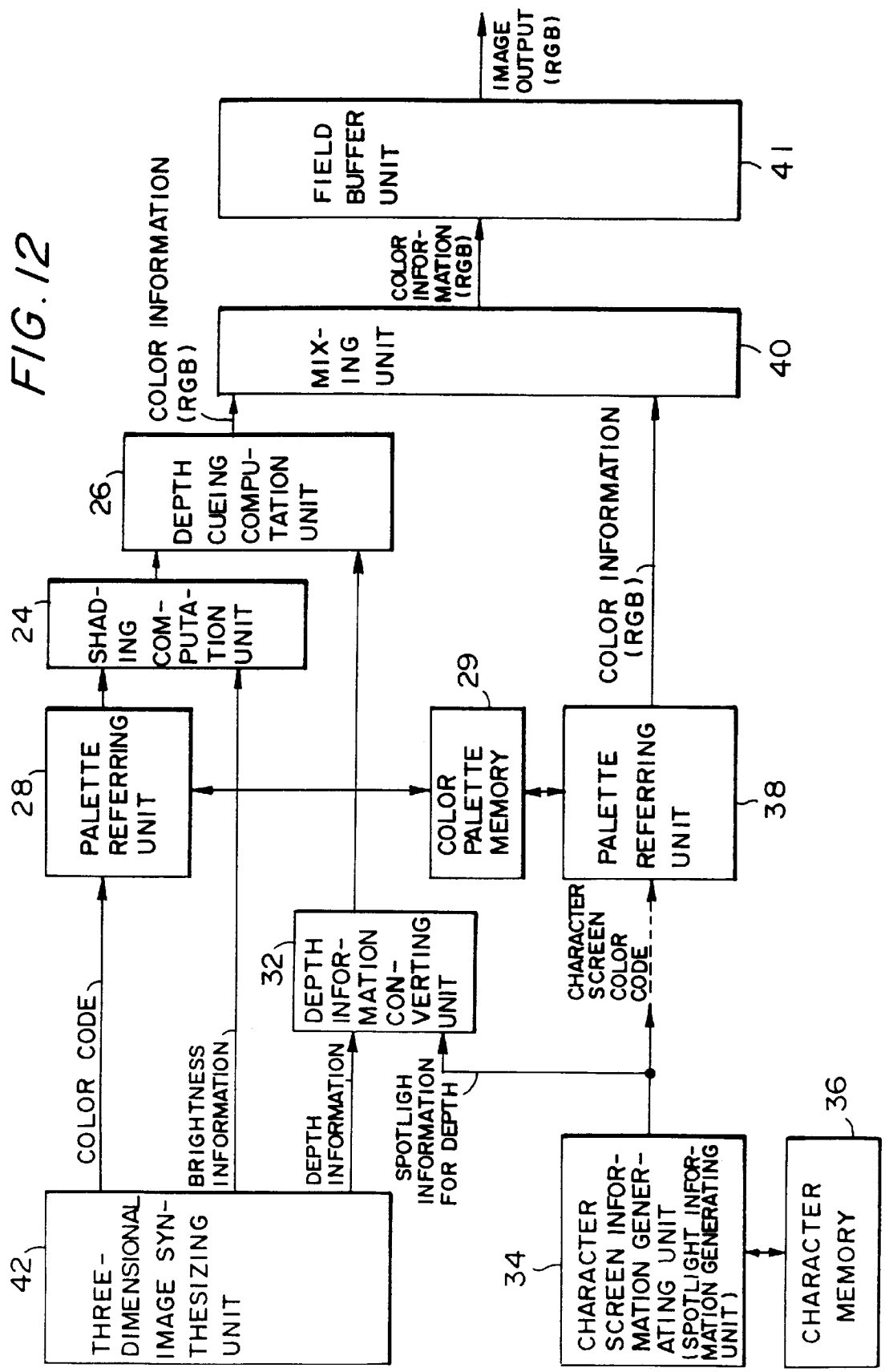

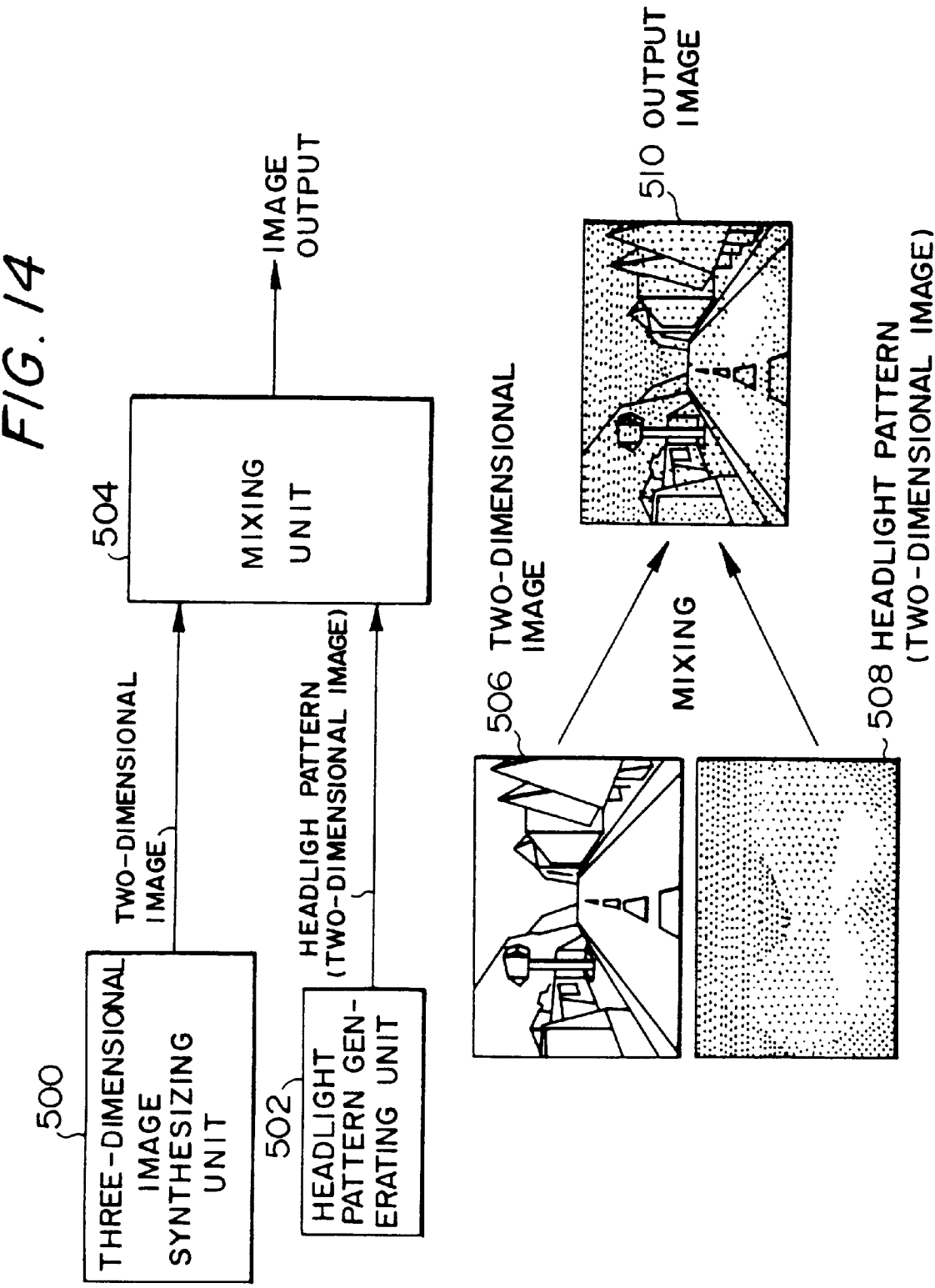

APPARATUS AND METHOD OF IMAGE SYNTHESIZATION

This is a continuation of application Ser. No. 08/682,780 filed Jul. 31, 1996, now abandoned, which is a U.S. National Stage Application of PCT/JP95/02442 filed Nov. 30, 1995. The entire disclosure of the prior applications is hereby incorporated by reference herein in its entirety.

BACKGROUND OF THE INVENTION

1. Field of the Invention

The present invention relates to an apparatus and method of synthesizing a spotlighted image.

2. Description of the Prior Art

Various types of image synthesizing systems are known which may be used in three-dimensional games, simulators for controlling airplanes and other vehicles and others. In such image synthesizing systems, image information relating to such a three-dimensional object 300 as shown in FIG. 13A has been stored therein. The three-dimensional object 300 represents a scenery or other expression which can be seen by a player (observer) 302 through a screen 306. The image information of the three-dimensional object 300 is perspectively transformed onto the screen 306 to form an image (projected image) 308. When the player 302 rotates or translates a moving body on which the player 302 is assumed to get through a control panel 304, the player 302 or the moving body will be changed in position and direction. Depending on such changes, a computation is performed relating to how manner the image of the three-dimensional object 300 is to be viewed on the screen 306 in. Such a computation will be made in real time following the control by the player 302. Thus, the player 302 can see a changed scenery or expression associated with the changed position and direction of the player or the moving body on which the player gets as a pseudo three-dimensional image in real time. This will make the player to experience a virtual reality in a virtual three-dimensional space.

FIG. 13B shows an image (game scene) which can be formed by such an image synthesizing system as described above.

It has been desired that the aforementioned image synthesizing systems have a spotlight display function of forming a more real image, for example, an image of a scene lighted up by headlights of a car.

One of various techniques for accomplishing such a spotlight display is shown in FIG. 14. Such a technique uses a mixing unit 504 for mixing a two-dimensional image 506 from a three-dimensional image synthesizing unit 500 with a headlight pattern (two-dimensional image) 508 which is a translucent pattern or brightness processing pattern from a headlight pattern generating unit 502 (to obtain a superimposed image or to change brightness) to form an output image 510. In such a case, the two-dimensional image 506 from the three-dimensional image synthesizing unit 500 has already been subjected to shading and depth cueing computation after the perspective transformation. The headlight pattern 508 from the headlight pattern generating unit 502 is a translucent pattern or brightness processing pattern so that the two-dimensional image 506 can be seen. The headlight pattern is further designed such that the pattern part intended to be on the optical axis of the headlight is more bright and the marginal part of the headlight is more dark in a direction apart from the optical axis.

However, such a technique has the following disadvantages. It is now assumed that a car which is radiating headlight beams is turned laterally against a wall by the side of a road due to any cause. Since the car is designed to move freely in a virtual three-dimensional space, it is naturally considered that such an event occurs. The headlight pattern 508 is intended to be most real when the car runs straight along a road. When the headlight beams are projected against the wall as described, however, a problem may be raised in that the headlight pattern is formed in a configuration far away from the reality. This is because the mixing unit 504 superimposes two images without their depth information.

In order to display the headlight with more reality, two light sources may be set in the headlight portion of the car. The shading computation may be then carried out based on the two light sources. However, since the two light sources cannot be considered to be at the infinite points in such a case, the light beams from the light sources cannot be made as parallel rays. Thus, the shading operation based on these light sources will require a huge computation, resulting in being more complicated. This is an obstruction on increasing the operational speed of the image synthesizing system and also on lowering the manufacturing cost of the same.

The present invention is directed to overcome the aforementioned technical problems. An object of the present invention is therefore to provide an image synthesizing system and method which can attain a spotlight display reflecting the depth information with high speed image synthesizing and low cost manufacturing.

SUMMARY OF THE INVENTION

To this end, the present invention provides an image synthesizing apparatus for displaying an image on a display by perspectively transforming a three-dimensional object onto a view screen of a view coordinate system, the apparatus comprising spotlight information generating means for generating spotlight information for brightness to perform a spotlight display, brightness information converting means for converting brightness information by using the spotlight information for brightness from the spotlight information generating means, shading computation means for determining color information to be displayed in each pixel on the display by using the brightness information converted by the brightness information converting means and color information of an object, and depth cueing computation means for performing depth cueing computation relative to the color information inputted from the shading computation means by using depth information.

According to the present invention, the conversion of the brightness information is carried out based on the spotlight information for brightness. Based on the converted brightness information, the shading computation and then the depth cueing computation will be made. This enables the spotlight display to be performed. Since the depth cueing computation which is based on the depth information is made after the brightness information converting, the spotlight display reflecting the depth information can be accomplished through a simple computation. As a result, a superior imaging effect can be provided while reducing the manufacturing cost in the image synthesizing apparatus.

In such a case, the conversion in the brightness information converting means can be provided by adding the spotlight information for brightness to the brightness information. If the positive spotlight information for brightness is added, thus, the pixels using the brightness information may be brightened or any color component in the pixels may be strengthened. If the negative spotlight information for brightness is added, the pixels using the brightness information may be darkened or any color component in the pixels may be weakened.

In the present invention, it may be preferred that the spotlight information generating means includes means for generating spotlight information for depth to perform a spotlight display together with the spotlight information for brightness, and that the image synthesizing apparatus further comprises depth information converting means for converting the depth information by using the spotlight information for depth from the spotlight information generating means.

The present invention also provides an image synthesizing apparatus for displaying an image on a display by perspectively transforming a three-dimensional object onto a view screen of a view coordinate system, the apparatus comprising spotlight information generating means for generating spotlight information for depth to perform a spotlight display, depth information converting means for converting depth information by using the spotlight information for depth from the spotlight information generating means, shading computation means for determining color information to be displayed in each pixel on the display by using color information of an object and brightness information, and depth cueing computation means for performing depth cueing computation relative to the color information inputted form the shading computation means by using the depth information converted by the depth information converting means.

According to the present invention, the spotlight information for depth is used to convert the depth information. The depth cueing computation is carried out based on the converted depth information. Thus, the image effect can be provided in pixels which have been subjected to the depth information converting so that a sense of distance from the viewpoint can be improved. For example, the spotlight display can be made in "fog".

According to the present invention, the processing in the depth information converting means can be provided by adding the spotlight information for depth to the depth information. If the positive spotlight information for depth is added, the image using the depth information will be seen at a farther distance. If the negative spotlight information for depth is added, the image using the depth information will be seen at a nearer distance.

According to the present invention, the image synthesizing apparatus further comprises a color palette memory having a plurality of color palettes, and palette referring means for reading the color information of the object from the plurality of color palettes based on a given color code to output the read color information toward the shading computation means, wherein back color information is set for each of the plurality of color palettes, and wherein the depth cueing computation means performs the depth cueing computation based on the depth information, the color information, and the back color information.

According to the present invention, various types of color effects can be provided by selecting any of said plurality of color palettes. According to the present invention, furthermore, the back color information can be set for each of the color palettes by externally setting the back color information or by having stored the back color information corresponding to each of the color palettes in the color palette memory. By changing the back color information, different back colors can be set for the objects to be displayed. Thus, various effects such as "fog" can be produced.

When the number of color palettes is equal to N (which is an integer number equal to or larger than 2), the back color information of N in number may be provided such that the back color information is caused to correspond to the color palette in one-to-one. Alternatively, the back color information of M in number (which is an integer number smaller than N) may be provided such that one back color information is caused to correspond to a plurality of color palettes.

The image synthesizing apparatus of the present invention further comprises a field buffer unit for storing information including at least one of the color information of the object, information used to generate the color information, brightness information and depth information in a storage area corresponding to each pixel in the display, wherein the spotlight information generating means outputs at least one of the spotlight information for brightness and the spotlight information for depth for each pixel in synchronization with a timing at which the stored information for each pixel is outputted from the field buffer unit and also generates character screen information for displaying a character image on the display.

According to the present invention, at least one of the color information, information used to generate the color information (color code, texture coordinates and others), brightness information and depth information is stored in the field buffer unit at each storage area. The spotlight information generating means can output at least one of the spotlight information (for brightness or for depth) and character screen information in synchronism with the output timing at the field buffer unit. Thus, one and the same hardware can be used to perform both the functions of generating the spotlight information and character screen information. If the image synthesizing apparatus initially includes means for generating the character screen information, for example, the spotlight information may be generated with minimum change of the hardware while reducing the manufacturing cost of the apparatus.

BRIEF DESCRIPTION OF THE DRAWINGS

FIG. 5 illustrates the structure of the color palette memory.

FIG. 12 is a block diagram of another different layout of the field buffer unit in the third embodiment.

FIG. 14 illustrates a prior art technique for performing a spotlight display.

DETAILED DESCRIPTION OF THE PREFERRED EMBODIMENTS

FIRST EMBODIMENT

Figure 1:
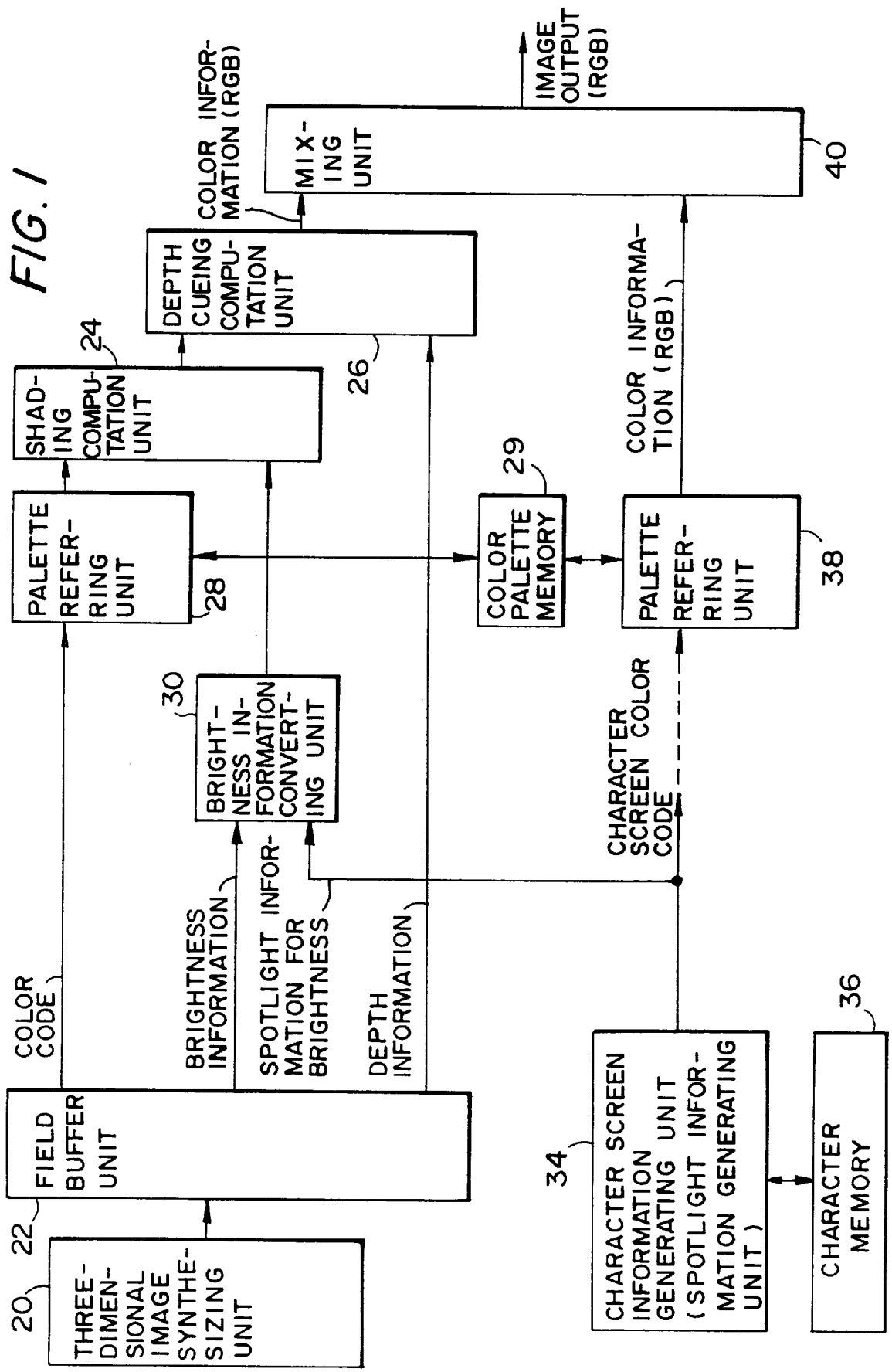
FIG. 1 is a block diagram of a first embodiment of the present invention.

FIG. 1 is a block diagram of a first embodiment of the present invention. Referring to FIG. 1, the first embodiment comprises a three-dimensional image synthesizing unit 20, a field buffer unit 22, a shading computation unit 24, a depth cueing computation unit 26, a palette referring unit 28, a color palette memory 29, a brightness information converting unit 30, a character screen information generating unit (spotlight information generating unit) 34, a character memory 36, a palette referring unit 38 and a mixing unit 40.

Figure 2:
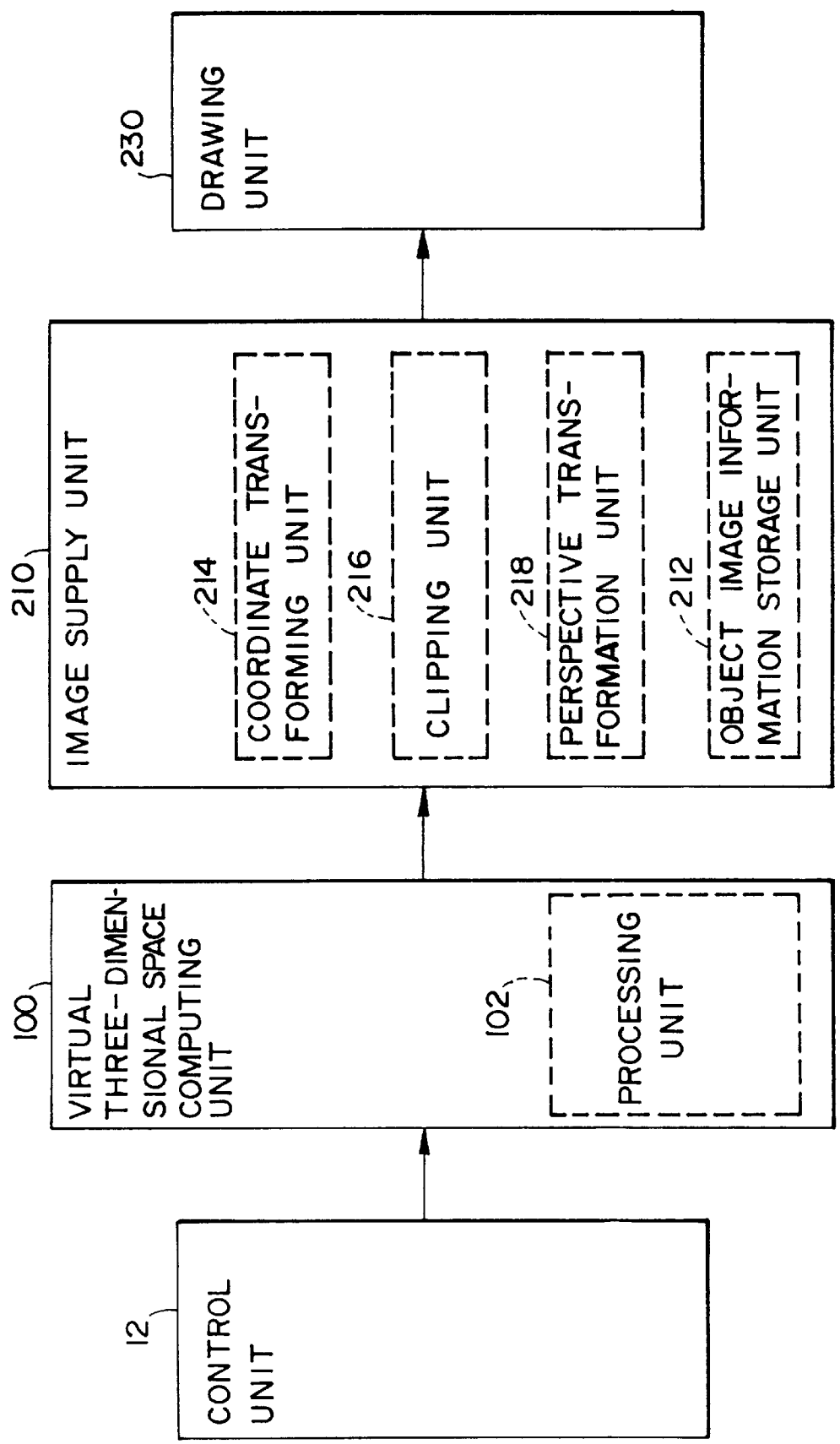
FIG. 2 is a clock diagram of the three-dimensional image synthesizing unit.

The three-dimensional image synthesizing unit 20 synthesizes a two-dimensional image after perspective transformation at a given viewpoint in a line-of-sight direction within a virtual three-dimensional space in which a plurality of objects are disposed. FIG. 2 shows the block diagram thereof.

In FIG. 2, a control unit 12 may include a steering wheel, accelerator and others if the image synthesizing apparatus is applied to a racing car game. These control instruments can be actuated by a player to input the necessary information.

A virtual three-dimensional space computing unit 100 computes to set the positions, directions and other factors of the objects (such as racing cars, courses, buildings and others) in the virtual three-dimensional space. Such a computation is carried out based on the operational information from the control unit 12, a game program stored in a processing unit 102, previously set and stored map information and others.

Figure 3:
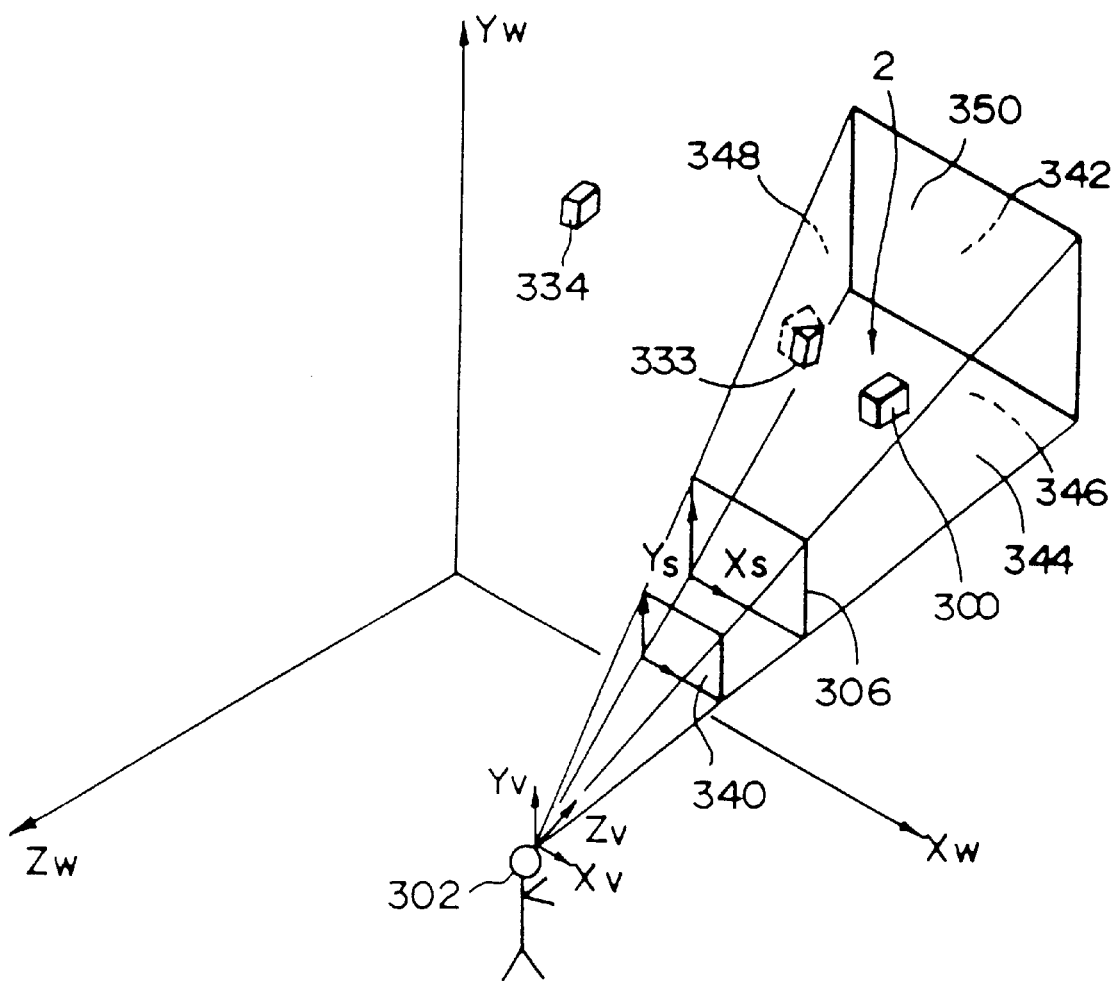
FIG. 3 is a view illustrating a three-dimensional computation in the first embodiment.

An image supply unit 210 performs various types of three-dimensional computations, based on the information of position, direction and others of the displayed object set by the virtual three-dimensional space computing unit 100 and the object image information read out from an object image information storage unit 212. As shown in FIG. 3, a first computation is carried out to dispose polygons forming objects 300, 333 and 334 such as racing cars, courses and others on the virtual three-dimensional space which is represented by the world coordinate system (absolute coordinate system) (XW, YW, ZW). A coordinate transforming unit 214 then transforms the coordinates of the polygons forming the objects into those of the view coordinate system (Xv, Yv, Zv) which has an origin corresponding to the viewpoint of a player 302. Thereafter, a clipping unit 216 performs a clipping process and a perspective transformation unit 218 then executes a perspective transformation to the screen coordinate system (XS, YS) Thereafter, a polygon format conversion and the other necessary treatments such as sorting and others are made.

The image supply unit 210 also executes a brightness computation, based on light from a light source which is located in place within the virtual three-dimensional space. In the present embodiment, further, the computed brightness information may be provided to the respective vertexes of a polygon as vertex brightness information.

A drawing unit 230 computes image information for all the dots in a polygon from data such as the polygon vertex coordinates, vertex brightness information subjected to the three-dimensional computation at the image supply unit 210.

In such a case, the image information to be determined may include color code, brightness information, depth information, texture coordinates (when the texture mapping technique is used) and other information.

Figure 4:
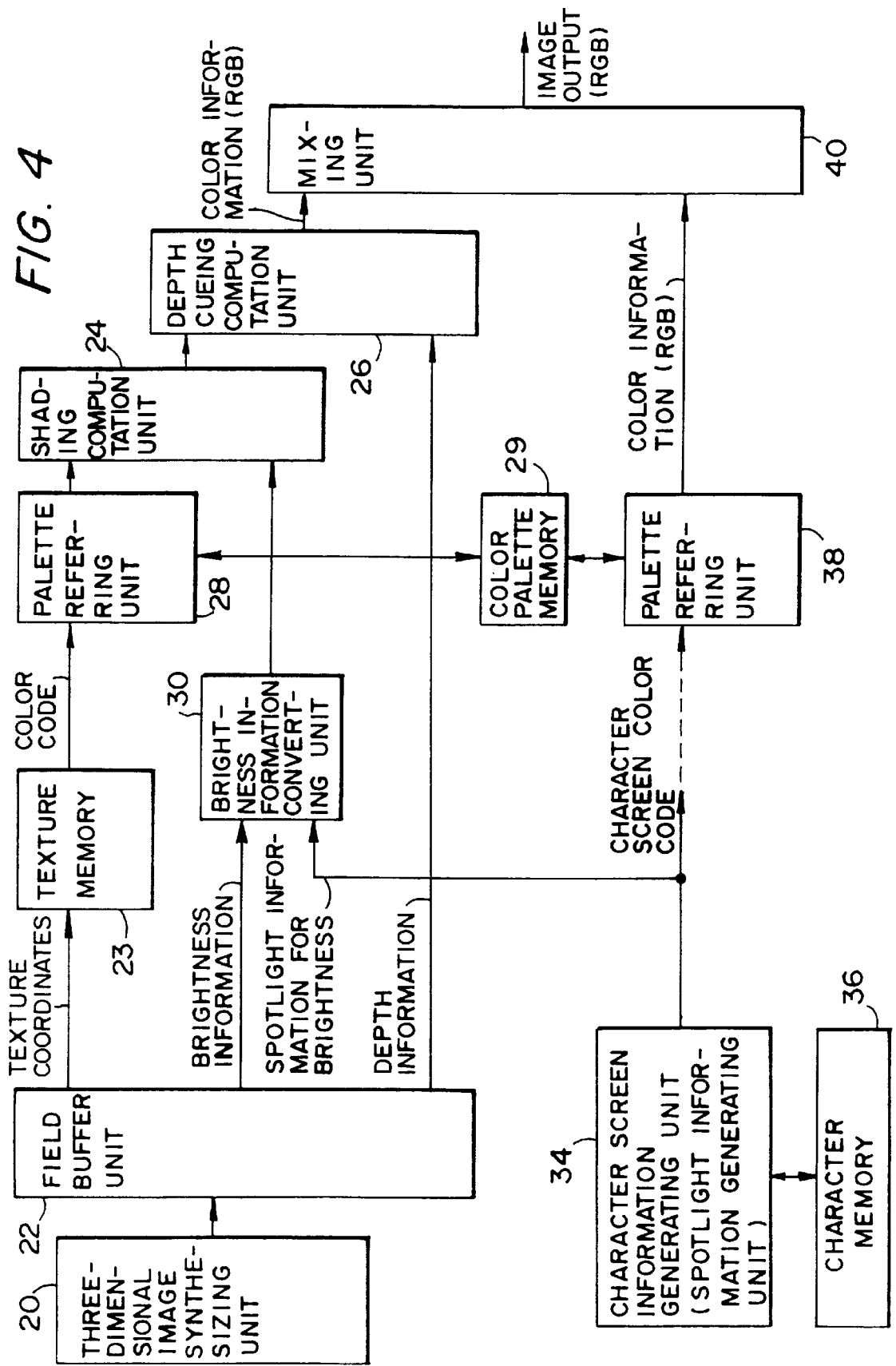
FIG. 4 is a block diagram illustrating a texture mapping usable in the first embodiment.

When the texture mapping technique is used in the present embodiment, a texture memory 23 is required to store textures. As shown in FIG. 4, the texture memory 23 is disposed between the field buffer unit 22 and the palette referring unit 28. In such a case, the field buffer unit 22 stores the texture coordinates determined by the drawing unit 230. Based on such texture coordinates, a color code will be read out from the texture memory 23 and then outputted toward the palette referring unit 28.

The texture memory 23 may be located before the field buffer unit 22. A color code may be read out from the texture memory 23 through the texture coordinates from the drawing unit 230 and then stored in the field buffer unit 22.

The field buffer unit 22 of FIG. 1 will be described. The field buffer unit 22 has storage areas corresponding to the respective pixels of a display. The storage areas store color codes, brightness information, depth information and the others for each of the pixels which were determined by the three-dimensional image synthesizing unit 20. However, the depth information is not necessarily provided to each of the pixels. The same depth information may be provided to a polygon for all the pixels of the polygon. If the texture mapping technique is used, the field buffer unit 22 stores the texture coordinates in place of the color codes, as can be seen from FIG. 4. The color codes, brightness information, depth information and other information will be outputted toward the palette referring unit 28, the brightness information converting unit 30, the depth cueing computation unit 26 and the like while scanning the scan lines on the display from upward to downward (or in interlace).

The palette referring unit and color palette memory 28, 29 will be described. FIG. 5 shows a structure of the color palette memory 29. This color palette memory 29 may include 128 color palettes (among them, only eight color palettes 0–7 being shown in FIG. 5). For example, the virtual three-dimensional space computing unit 100 as shown in FIG. 2 may specify any color palette to be used. If it is assumed that the color palette 0 and color code 92 are specified, the object color information, (R, G, B)=(170, 65, 30), will be read out. The palette referring unit 28 reads this color information from the color palette memory 29, based on the color code outputted from the field buffer unit 22. The read color information is then outputted toward the shading computation unit 24.

In the present embodiment, the same color code can cause different color information to be outputted by specifying different color palettes. Thus, various kinds of color effects can be accomplished.

The shading computation unit 24 determines color information to be displayed for each pixel on the display, based on the color information from the palette referring unit 28 and also the brightness information computed by the three-dimensional image synthesizing unit 20 and stored in the field buffer unit 22 (the brightness information having been actually converted by the brightness information converting unit 30). It is, for example, assumed that the color information outputted from the palette referring unit 28 is (R, G, B)=(50, 50, 50) (slightly grayish white color) and that the inputted brightness information is to increase the brightness four times. Thus, the shading computation unit 24 will output the other color information that is (R, G, B)=(200, 200, 200) (bright white color). The brightness information inputted into the shading computation unit 24 may be 8-bit data, so that a brightness can be specified through 256 stages (1–256). If it is, for example, set such that one-to-one setting will be provided when the brightness information is equal to 64, this brightness information can be used to set the brightness of the color information outputted from the palette referring unit 28 from 1/64 times (brightness information=1) to 4 times (brightness information=256). Thus, the results of Gouraud shading and Phong shading obtained by the three-dimensional image synthesizing unit 20 can be reflected to the object color information to determine the color information to be displayed for each pixel on the display.

Figure 6:
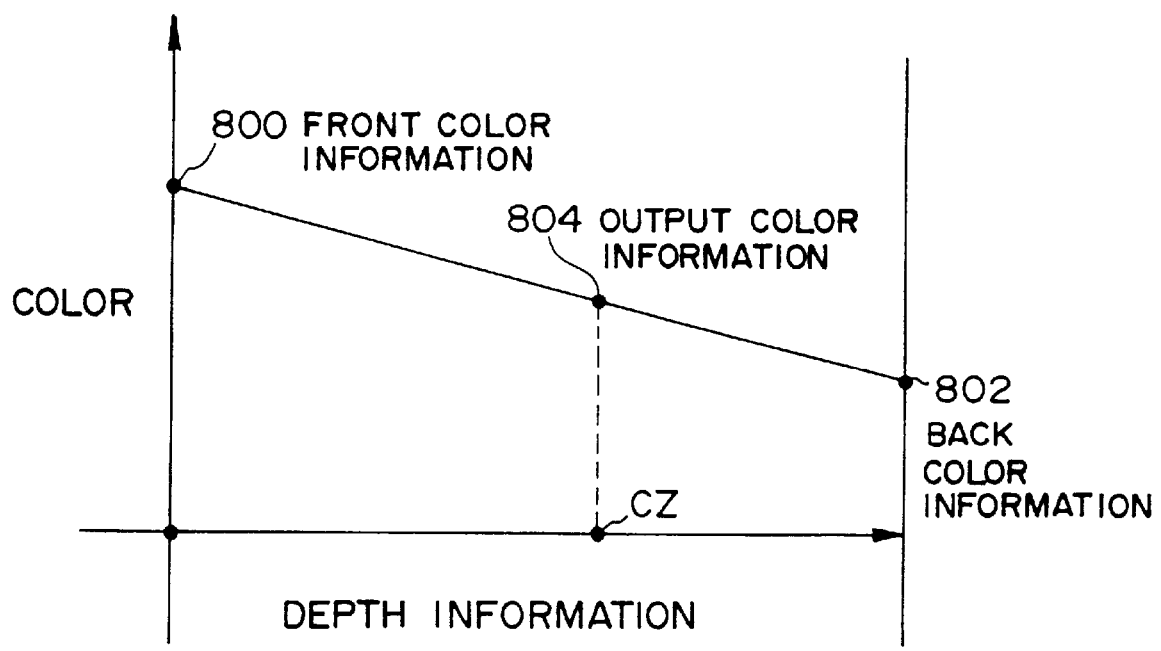
FIG. 6 is a graph illustrating a depth cueing computation.

The depth cueing computation unit 26 performs a depth cueing operation relative to the color information inputted from the shading computation unit 24, based on the depth information. FIG. 6 is a view illustrating an example of this depth cueing computation. In the present embodiment, the color information is interpolated by the back color information 802, based on the depth information. This depth information may be considered to be a distance from the viewpoint (Z-coordinate value). As shown in FIG. 6, the depth cueing computation first specifies the back color information 802. The back color information 802 may be specified for each of the color palettes, for example, by the virtual three-dimensional space computing unit 100 or may be stored in the color palette memory 29 at a location corresponding to the respective one of the color palettes. In FIG. 6, front color information 800 is color information inputted into the depth cueing computation unit 26 through the shading computation unit 24. The depth information CZ is inputted through the field buffer unit 22. The depth cueing computation unit 26 determines output color information 804 through a given interpolation (e.g., linear interpolation), based on the front color information 800, back color information 802 and depth information CZ. The determined color information is then outputted toward the mixing unit 40.

If a virtual three-dimensional space representing "fog" is to be formed, the back color information may be set "white color" (e.g., (100, 100, 100)). Thus, the above depth cueing computation treats the color information such that it will approach "white" as the distance from the viewpoint increases. In such a manner, a "fog" effect can be provided. If a "sunset glow" is to be set, the back color information 802 will be set (200, 50, 30) to increase the red color. If a "deep sea" or "shallow sea" is to be set, the back color information 802 will be set (0, 0, 50) or (50, 50, 200) to approach the blue color to the black color or to strengthen the blue color. If a "green planet" is wanted, a green color is slightly added to the "fog" component. If a "sandstorm" is wanted, a yellow color is slightly added to the "fog" component. In such a manner, various kinds of virtual three-dimensional spaces can be provided according to the present invention.

Figure 7:
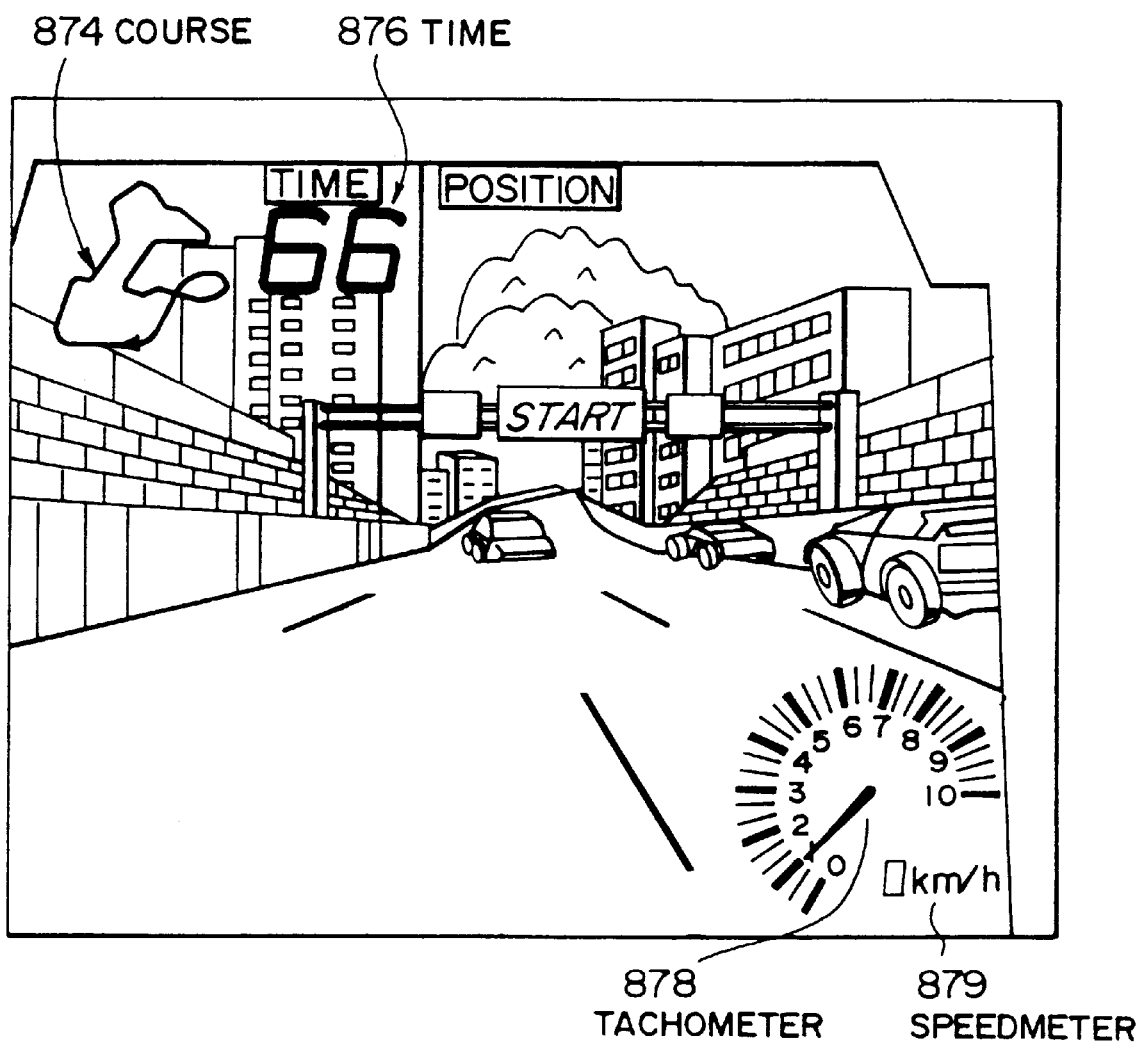
FIG. 7 is a view illustrating character images.

The character screen information generating unit 34 is used to display character images on the screen. As shown in FIG. 7, the character screen information generating unit 34 may generate image information relating to characters such as a course 874, a time 876, a tachometer 878, and a speedometer 879. In such a case, the image information of the characters (color codes and others) have been stored in the character memory 36. The character screen information generating unit 34 reads out the image information relating to the course 874, time 876 and others from the character memory 36. The read image information is then computed to be arranged on the screen at such locations as shown in FIG. 7. Thus, the character screen information will be generated.

In other words, the read color codes of the characters are outputted toward the palette referring unit 38 in synchronism with the output of color codes, brightness information and others from the field buffer unit 22 while scanning the scan lines from upward to downward. The palette referring unit 38 responds to the inputted color codes for reading out the corresponding color information from the color palette memory 29, the color information being then outputted toward the mixing unit 40. The mixing unit 40 performs the mixing operation to form and output such an image as shown in FIG. 7.

In the present embodiment, the character screen information generating unit 34 also serves as a spotlight information generating unit. More particularly, the character screen information generating unit 34 can generate not only the character screen information, but also the spotlight information for brightness. The spotlight information for brightness is outputted toward the brightness information converting unit 30 at the same timing as outputting the color codes of the characters. Thus, the spotlight information for brightness will be outputted toward the brightness information converting unit 30 at the same timing as outputting the color codes, brightness information and others from the field buffer unit 22 while scanning the scan lines from upward to downward. Thus, the spotlight display such as headlight can be provided to a desired position on the screen by arranging the spotlight information for brightness from the character screen information generating unit 34 at a location corresponding to each pixel on the display in a manner similar to the field buffer unit 22. The character screen information generating unit 34 may be included in most of such image synthesizing systems. According to the present embodiment, therefore, the spotlight display can be accomplished without need of any new hardware for generating the spotlight information. This enables the manufacturing cost to be reduced. Furthermore, the character screen information generating unit 34 of such a type can perform both the vertical and transverse scrollings such that the spotlight display can also be scrolled through such a function.

If the character screen information generating unit 34 controls the color code, for example, in a unit of 8-bit, the most significant bit may be controlled to switch the character screen information generating unit to the spotlight information generating unit or vice versa. Although the number of stages in the representable color code decreases from 256 to 128 in such a case, such a technique may sufficiently be used in a practical manner since the display of characters does not require very much color information. Thus, the spotlight information for brightness outputted toward the brightness information converting unit 30 can be changed over 128 stages.

The brightness information converting unit 30 converts the brightness information inputted from the field buffer unit 22 using the spotlight information for brightness inputted thereto from the character screen information generating unit 34 which also serves as the spotlight information generating unit. In the present embodiment, positive or negative spotlight information for brightness may be added to the brightness information. For example, if the brightness information from the field buffer unit 22 is equal to 100 and the spotlight information for brightness is equal to 50, brightness information=150 will be outputted toward the shading computation unit 24 which in turn performs the computation of color information (shading and brightness computation) for a corresponding pixel using this brightness information=150. In the present embodiment, the spotlight information for brightness from the character screen information generating unit 34 may have such a pattern as provides a headlight illumination effect. More particularly, the intended optical axis of the headlight is most bright (or the spotlight information for brightness increases) and the headlight beam part surrounding the optical axis thereof is gradually darkened (or the spotlight information for brightness decreases). When such spotlight information for brightness is added to the brightness information, the added part can have a more bright color, resulting in a spotlight display as in the headlight or the like.

Although the brightness information and spotlight information for brightness have been described to be common to all color components R, G and B, the present invention is not limited to such an arrangement, but may be applied to each color component R, G or B, separately. For example, if the brightness information converting unit 30 makes the brightness information converting to strengthen the red-colored brightness component, a pattern of red-colored headlight can be formed. Similarly, the spotlight display can be executed with any color.

The processing in the brightness information converting unit 30 is not limited to the addition. A given functional formula represented by addition, subtraction, multiplication, division or the like may be provided to perform the conversion. A conversion table may previously be provided to read required data from the conversion table, based on the inputted brightness information and spotlight information for brightness.

In the present embodiment, the brightness information converting unit 30 performs the brightness conversion for spotlight display prior to the depth cueing computation. After the brightness conversion, the depth cueing computation can be made to execute the spotlight display reflecting the depth information. If the back color information is set to be "black color", the depth cueing computation unit 26 performs a computation which interpolates the color information to "black color". This may provide an effect by which an object located at a farther distance is darker. Therefore, the headlight pattern generated by the present embodiment is such that the headlight beam becomes darker at a farther distance. This can realize the display of headlight reflecting the depth information. Even if in a racing car game, a racing car is turned against a wall, an image representing a more real headlight pattern which is reflecting the depth information from the racing car to the wall can be synthesized. In the present embodiment, the spotlight display can be realized only by utilizing the existing character screen information generating unit 34 to generate the spotlight information for brightness which is in turn processed by the brightness information converting unit 30, without any massive and complicated computation which includes a simulation of headlight source in the three-dimensional image synthesizing unit 20, for example. In other words, the spotlight display reflecting the depth can be made while the hardware for performing the spotlight display is not required to be greatly improved in speed and scale. This can provide a high-quality image through an image synthesizing system which can be constructed with a reduced manufacturing cost.

SECOND EMBODIMENT

Figure 8:
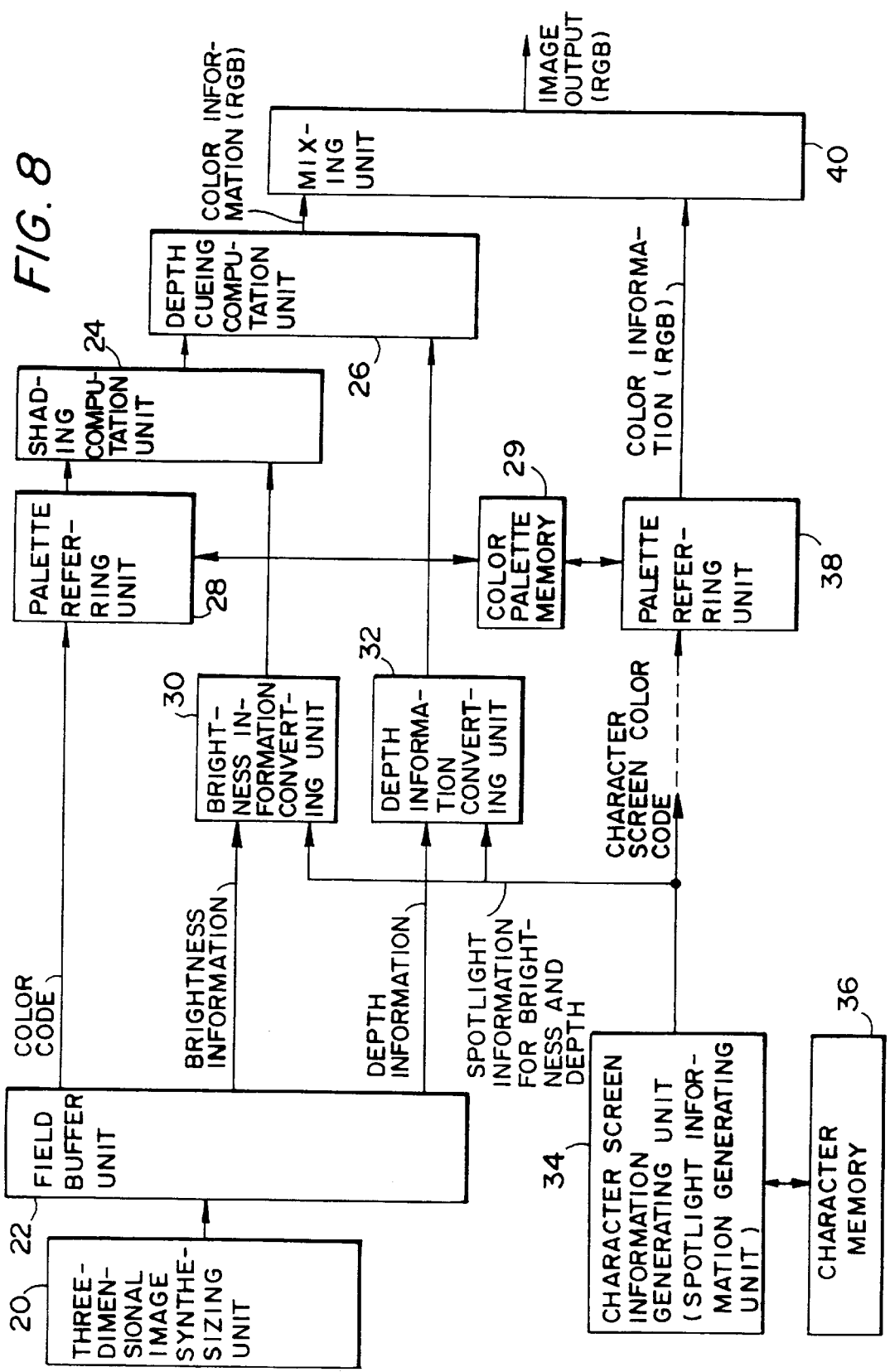
FIG. 8 is a block diagram of a second embodiment of the present invention.

FIG. 8 is a block diagram of a second embodiment according to the present invention. As can be seen from a comparison between FIGS. 1 and 8, the second embodiment is different from the first embodiment in that a depth information converting unit 32 is newly provided and that the character screen information generating unit 34 outputs spotlight information for brightness and depth which are in turn inputted into the brightness and depth information converting units 30, 32, respectively. The brightness and depth information converted by the brightness and depth information converting units 30, 32 are respectively inputted into the shading and depth cueing computation units 24, 26 wherein the shading and depth cueing computations are executed based on these inputted information.

The depth information converting unit 32 uses the spotlight information for depth from the character screen information generating unit 34 which is also serving as the spotlight information generating unit to process the depth information. In the present embodiment, positive or negative spotlight information for depth may be added to the depth information. For example, if the depth information CZ is equal to 50 and the spotlight information for depth is equal to 10, depth information CZ equal to 60 is outputted toward the depth cueing computation unit 26 wherein the depth cueing computation is carried out based on this depth information=60. In such a case, as can be seen from FIG. 6, the output color information 804 more approaching the back color information 802 will be outputted from the depth cueing computation unit 26. It is of course that the processing in the depth information converting unit 32 is not limited to the addition. For example, the depth information may be multiplied by the spotlight information for depth. Alternatively, an interpolation may be preformed between the depth information and the spotlight information for depth. Furthermore, three types of depth information may be provided for R, G and B. Thus, the respective one of the R, G and B components may be subjected to the depth cueing computation, separately. When only the G and B components are reduced by subjecting them to the depth cueing computation, leaving only the R component, for example, the background color can be treated to approach red color.

For example, the depth cueing computation may be represented by:

CR=gR(fR(CRX, BR), CZR);

CG=gG(fG(CGX, BG), CZG); and

CB=gB(fB(CBX, BB), CZB)

where CRX, CGX and CBX are object color information; BR, GR and BB are brightness information inputted into the shading computation unit 24; fR, fG and fB are functions representing the shading computations in the shading computation unit 24; CZR, CZG and CZB are R, G, B components in the depth information; gR, gG and gB are functions representing the depth cueing computations in the depth cueing computation unit 26; and CR, CG and CB are final color information outputted from the depth cueing computation unit 26. In such a case, such settings as fR=fG=fB; CZR=CZG=CZB and gR=gG=gB may be made.

In the present embodiment, the depth information can be converted by the depth information converting unit 32, the converted depth information being then used to execute the depth cueing computation. This can produce an image effect by which the sense of distance from the viewpoint can be improved at a pixel part subjected to this depth information conversion. For example, it is now assumed that a spotlight display is to be made in a virtual three-dimensional space set to have a "fog". This setting of "fog" can be accomplished by setting the back color information in the depth cueing computation unit 26 at a "white color". In such a case, the reality in the resulting image can be improved by increasing the visibility for the spotlighted part. In the present embodiment, the depth information converting unit 32 converts the depth information to have a reduced value for the spotlighted part in order to accomplish an improved reality. This can be done by reducing the value of the spotlight information for depth to be outputted from the character screen information generating unit 34 relating to the spotlighted part. If so done, as can be seen from FIG. 6, the output color information 804 will be apart from the back color information 802 which represents the color of the "fog". Thus, the spotlighted part can be delayed to be covered with the "fog". As a result, an image effect by which the spotlight display is executed in the "fog" can be provided. In the present embodiment, such an image effect as would be accomplished only by a complicated computation in the prior art can be provided merely by a very simple technique that only converts the depth information inputted into the depth cueing computation unit 26.

THIRD EMBODIMENT

Figure 9:
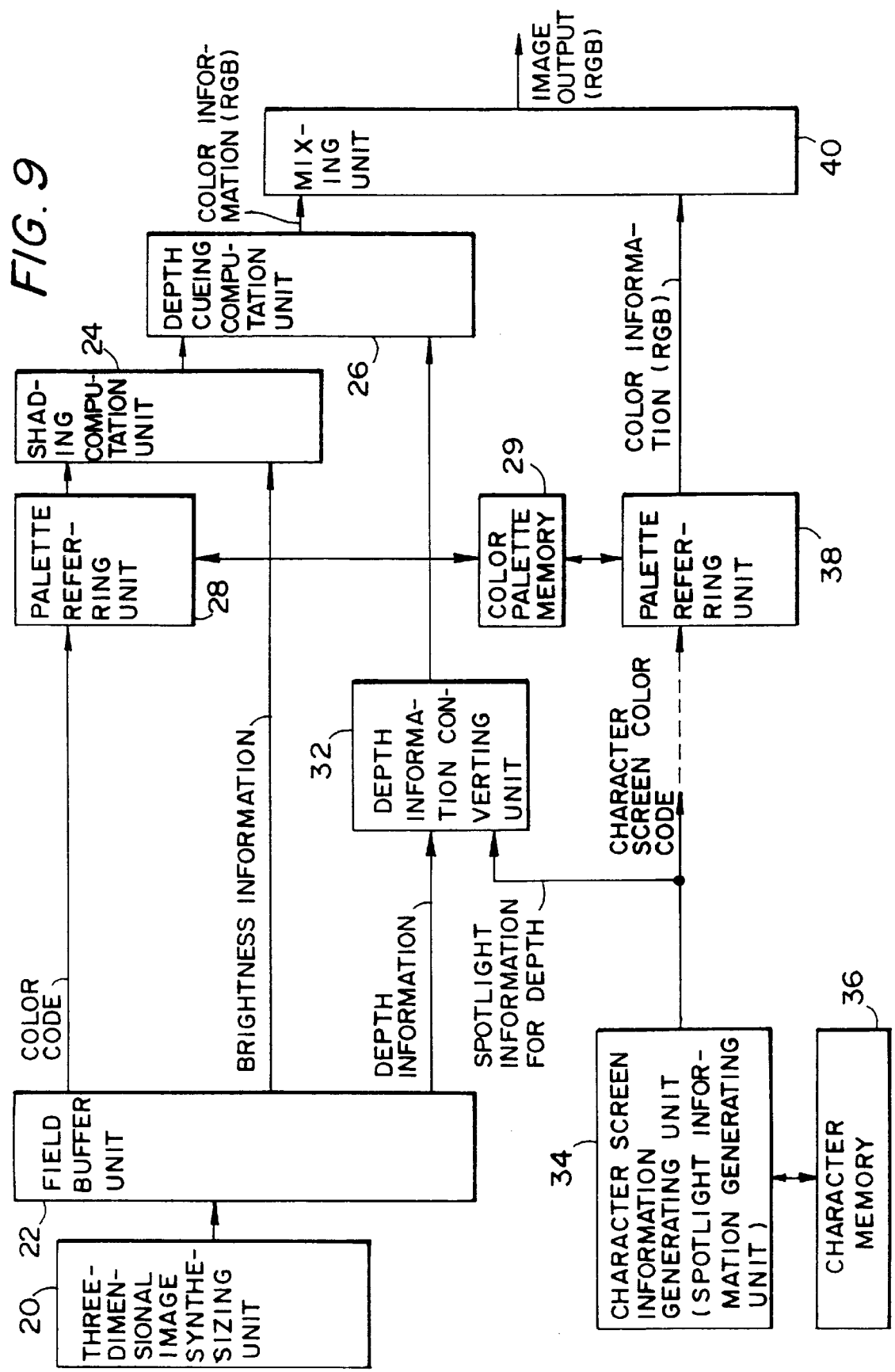
FIG. 9 is a block diagram of a third embodiment of the present invention.

FIG. 9 is a block diagram of a third embodiment according to the present invention. As can be seen from a comparison of FIG. 1 with FIG. 9, the third embodiment is characterized by that it comprises a depth information converting unit 32 in place of the brightness information converting unit 30. The character screen information generating unit 34 generates the spotlight information for depth rather than the spotlight information for brightness. The spotlight information for depth is inputted into the depth information converting unit 32. The depth information converting unit 32 uses the spotlight information for depth to convert depth information from the field buffer unit 22, the result being then outputted toward the depth cueing computation unit 26. The brightness information outputted from the field buffer unit 22 is inputted into the shading computation unit 24 without being subjected to the conversion by the brightness information converting unit.

Figure 10:
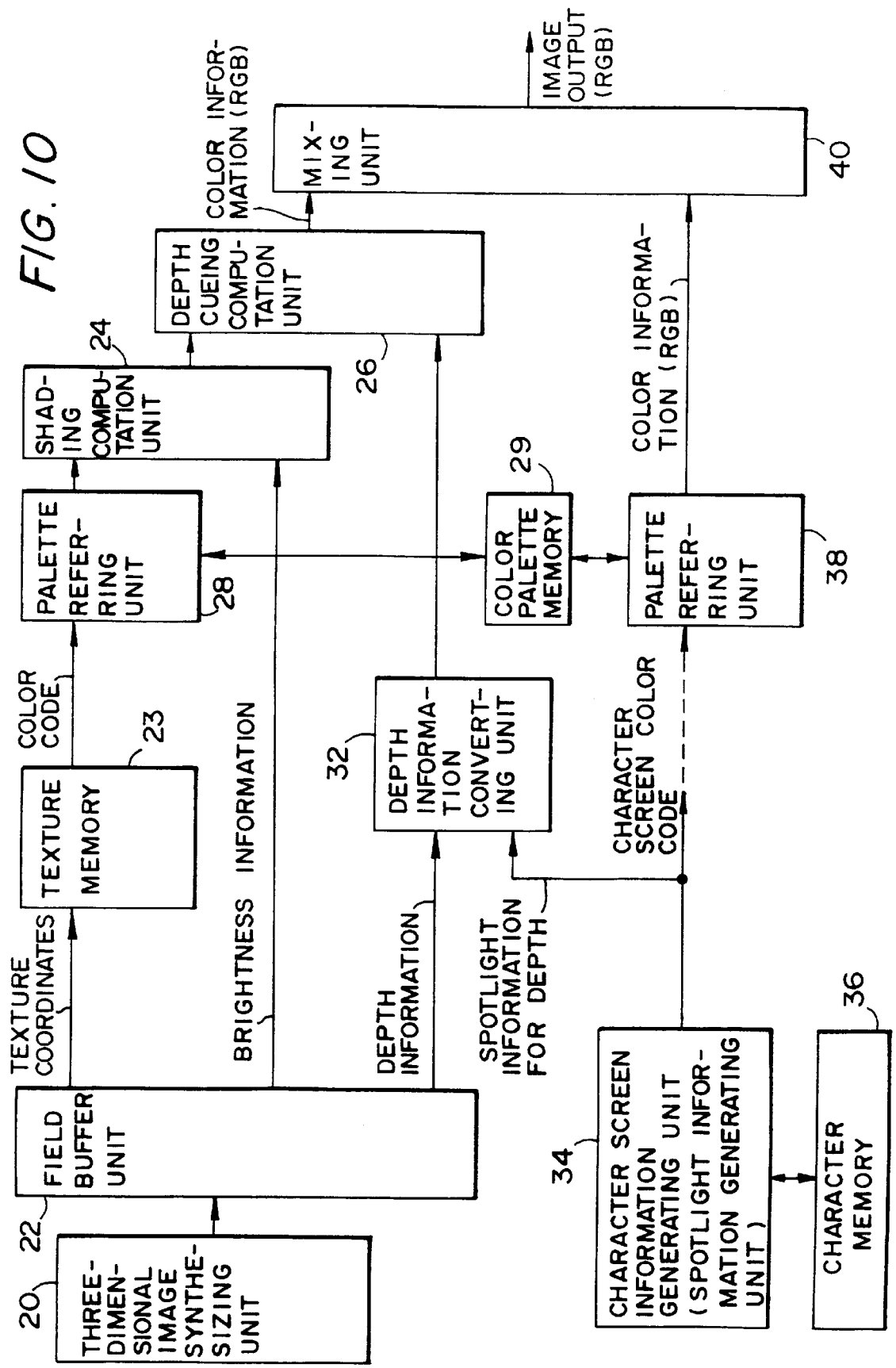
FIG. 10 is a block diagram illustrating a texture mapping usable in the third embodiment.

According to the third embodiment, the part to be spotlightted can be delayed to be covered with the "fog", for example, as shown in the second embodiment. As a result, an image effect by which the spotlight display can be executed in the "fog". The conversion and other treatments by the depth information converting unit 32 are similar to those of the second embodiment, but will not further be described herein. FIG. 10 is a block diagram illustrating that the texture memory 23 is disposed between the field buffer unit 22 and the palette referring unit 28. It is of course that the texture memory 23 may be located before the field buffer unit 22.

The present invention is not limited to the first to third embodiments, but may be embodied in any of various changes and modifications within the scope of the present invention.

Figure 11:
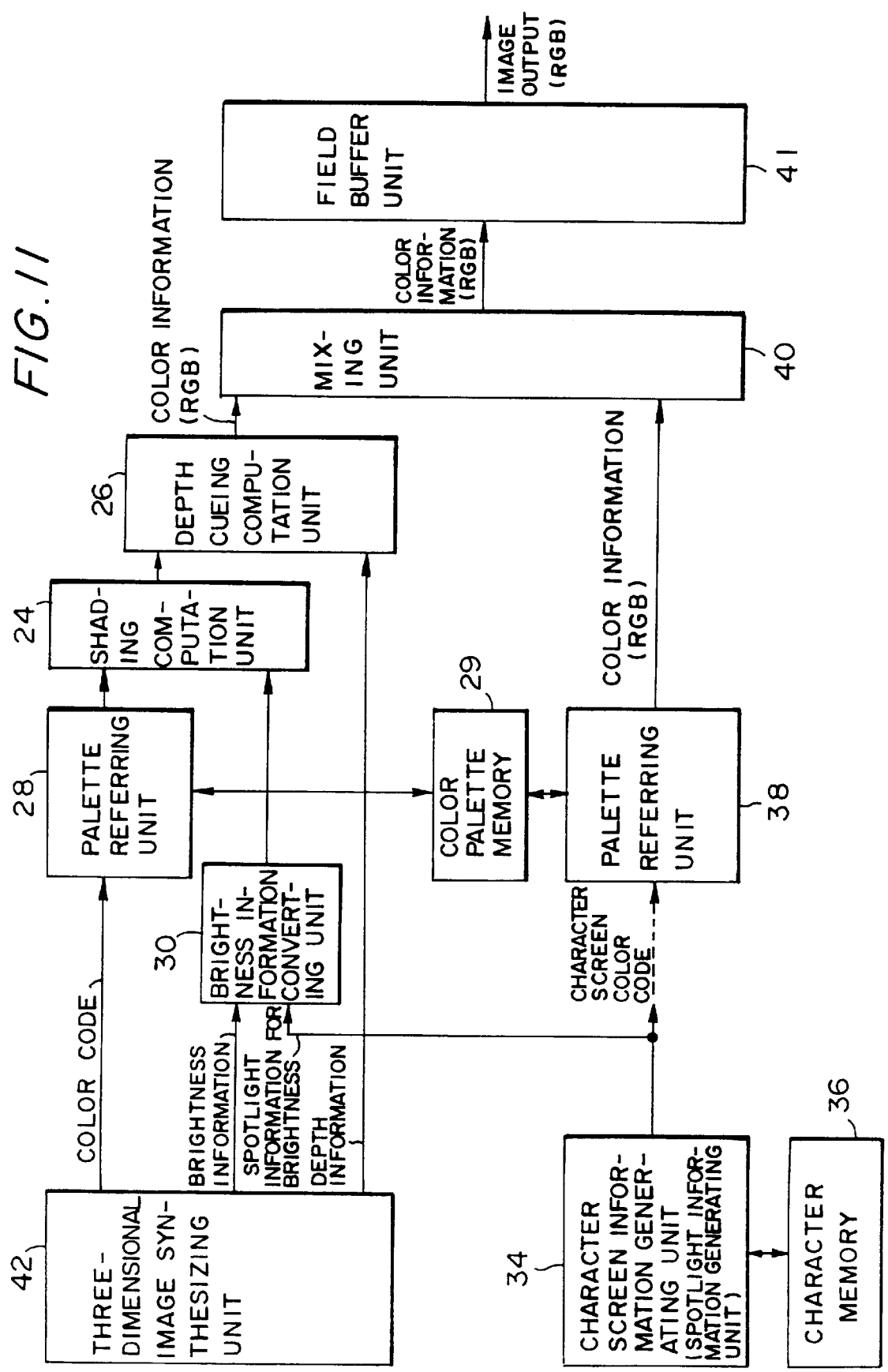
FIG. 11 is a block diagram of a different layout of the field buffer unit in the first embodiment.
Figure 13A:
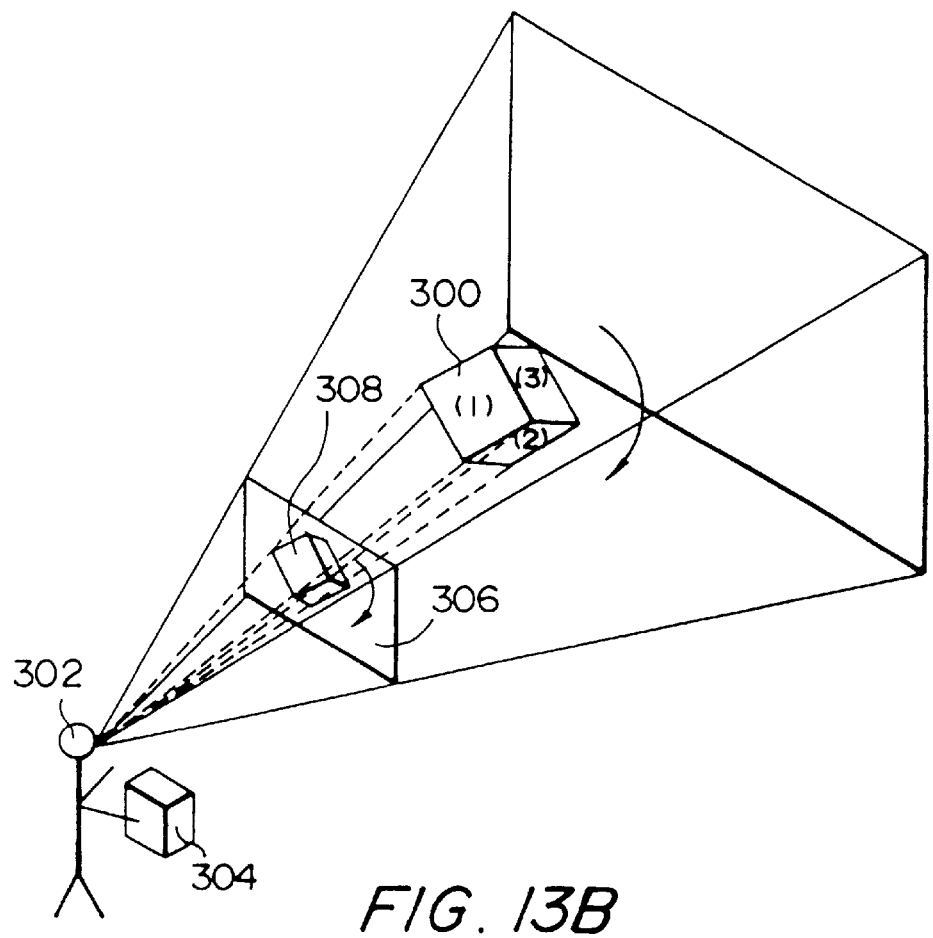
FIG. 13A is a view schematically illustrating the concept of the image synthesizing apparatus that can form a three-dimensional image.
Figure 13B:
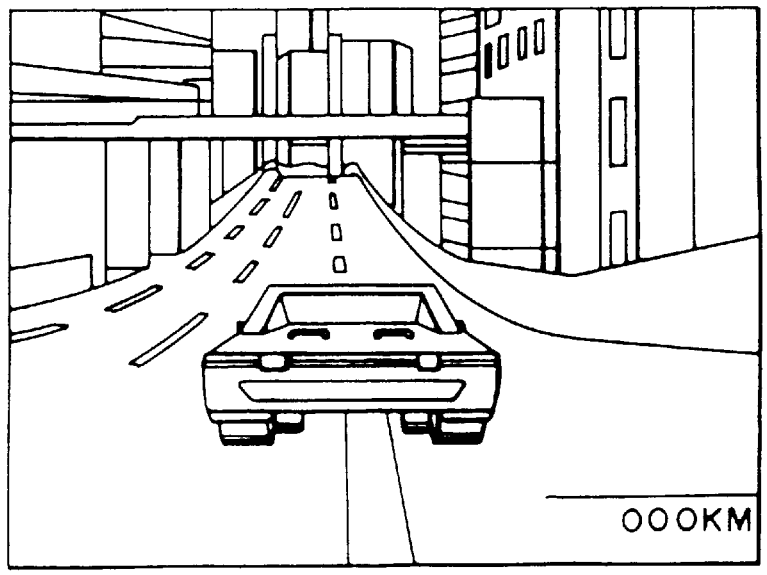
FIG. 13B is a view of an image formed by the image synthesizing apparatus shown in FIG. 13A.

For example, as shown in FIG. 11, a field buffer unit 41 may be disposed at the next stage of the mixing unit 40 (or at the next stage of the depth cueing computation unit 26), unlike the first embodiment in which the field buffer unit 22 is disposed at the next stage of the three-dimensional image synthesizing unit 20. Similarly, the field buffer unit 41 may be disposed at the next stage of the mixing unit 40 (or at the next stage of the depth cueing computation unit 26) in the second and third embodiments. For example, FIG. 12 shows the field buffer unit 41 disposed at the next stage of the mixing unit 40 at its rearward stage in the third embodiment.

Although the first to third embodiments have been described as to such a structure as comprising the color palette memory 29 and the palette referring units 28, 38, the present invention may be applied to any of the other configurations which do not include these components.

Although the first to third embodiments have been described as to the character screen information generating unit 34 which also serves as the spotlight information generating unit, the present invention can be applied to such an arrangement that the character screen information generating unit is provided separately from the spotlight information generating unit.

Such a computation technique as carried out by the three-dimensional image synthesizing unit is not limited to one as described in connection with the aforementioned embodiments, but may be made by any of various other known techniques. For example, any of various other shading techniques may be taken. The drawing technique may be replaced by any other measure such as scan line algorithm or the like without limitation to the drawing technique carried out relative to each of the polygons.

The computation techniques executed by the brightness information converting unit, depth information converting unit, shading computation unit and depth cueing computation unit are not limited to the aforementioned techniques, but may be realized by any of various other known techniques.

The image synthesizing apparatus of the present invention may be applied to an arcade games machine, a domestic games machine, a flight simulator, a driving simulator and others. Particularly, the principle of the present invention may naturally be applied to algorithms in game programs stored in game cartridges, CR-ROM's and floppy disks which are used in a domestic games machine and personal computers. Furthermore, the image synthesizing apparatus of the present invention may be applied to large-scaled game systems or simulation systems in which a number of players will be joined together.

If the image synthesizing apparatus of the present invention is applied to a game machine, it may be applied to any of various games such as racing car games, battle games, roll-playing games, space ship games including three-dimensional maps and others.

Each of the computations of the present invention executed by the three-dimensional image synthesizing unit, depth information converting unit, brightness information converting unit, character screen information generating unit, palette referring unit, shading computation unit and depth cueing computation unit may be treated by an exclusive image processing device or a general-purpose computer, DSP and the like in a software manner.

What is claimed is:

1. An image synthesizing apparatus for displaying an image on a display by perspectively transforming a three-dimensional object onto a view screen of a view coordinate system, said apparatus comprising:

spotlight information generating means for generating spotlight information for brightness to perform a spotlight display;

brightness information converting means for converting brightness information by using said spotlight information for brightness from said spotlight information generating means;

shading computation means for determining color information to be displayed in each pixel on said display by using brightness information converted by said brightness information converting means and color information of an object;

depth cueing computation means for performing depth cueing computation relative to said color information inputted from said shading computation means by using depth information; and a field buffer unit for storing information including at least one of said color information of said object, information used to generate said color information, brightness information and depth information in a storage area corresponding to each pixel in said display, wherein said spotlight information generating means outputs at least one of said spotlight information for brightness and said spotlight information for depth for each pixel in synchronization with a timing at which said stored information for each pixel is output from said field buffer unit and also generates character screen information for displaying a character image on said display.

2. The image synthesizing apparatus according to claim 1 wherein said brightness information converting means performs the conversion by adding said spotlight information for brightness to said brightness information.

3. The image synthesizing apparatus according to claim 2 wherein said spotlight information generating means includes means for generating spotlight information for depth to perform a spotlight display together with said spotlight information for brightness, and wherein said image synthesizing apparatus comprises depth information converting means for converting said depth information by using said spotlight information for depth inputted from said spotlight information generating means.

4. The image synthesizing apparatus according to claim 3 wherein said depth information converting means performs the conversion by adding said spotlight information for depth to said depth information.

5. An image synthesizing apparatus for displaying an image on a display by perspectively transforming a three-dimensional object onto a view screen of a view coordinate system, said apparatus comprising spotlight information generating means for generating spotlight information for brightness to perform a spotlight display, the spotlight information generating means includes means for generating spotlight information for depth to perform a spotlight display together with said spotlight information for brightness;

brightness information converting means for converting brightness information by using said spotlight information for brightness from said spotlight information generating means;

shading computation means for determining color information to be displayed in each pixel on said display by using brightness information converted by said brightness information converting means and color information of an object; and depth cueing computation means for performing depth cueing computation relative to said color information input from said shading computation means by using depth information; and depth information converting means for converting said depth information by using said spotlight information for depth inputted from said spotlight information generating means.

6. The image synthesizing apparatus according to claim 5 wherein said depth information converting means performs the conversion by adding said spotlight information for depth to said depth information.

7. An image synthesizing apparatus according to claim 5, further comprising:

a color palette memory having a plurality of color palettes; and palette referring means for reading said color information of said object from said plurality of color palettes based on a given color code, the read color information being then outputted therefrom toward said shading computation means;

wherein back color information is set for each of said plurality of color palettes; and wherein said depth cueing computation means performs said depth cueing computation based on said depth information, said color information and said back color information.

8. The image synthesizing apparatus according to claim 5, further comprising a field buffer unit for storing information including at least one of said color information of said object, information used to generate said color information, brightness information and depth information in a storage area corresponding to each pixel in said display, wherein said spotlight information generating means outputs at least one of said spotlight information for brightness and said spotlight information for depth for each pixel in synchronization with a timing at which said stored information for each pixel is outputted from said field buffer unit and also generates character screen information for displaying a character image on said display.

9. An image synthesizing apparatus according to claim 1, further comprising:

a color palette memory having a plurality of color palettes; and palette referring means for reading said color information of said object from said plurality of color palettes based on a given color code, the read color information being then outputted therefrom toward said shading computation means;

wherein back color information is set for each of said plurality of color palettes; and wherein said depth cueing computation means performs said depth cueing computation based on said depth information, said color information and said back color information.

10. An image synthesizing apparatus for displaying an image on a display by perspectively transforming a three-dimensional object onto a view screen of a view coordinate system, said apparatus comprising:

spotlight information generating means for generating spotlight information for depth to perform a spotlight display;

depth information converting means for converting depth information by using said spotlight information for depth from said spotlight information generating means;

shading computation means for determining color information to be displayed in each pixel on said display by using color information of an object and brightness information; and depth cueing computation means for performing depth cueing computation relative to said color information inputted from said shading computation means by using said depth information converted by said depth information converting means.

11. The image synthesizing apparatus according to claim 10 wherein said depth information converting means performs the conversion by adding said spotlight information for depth to said depth information.

12. An image synthesizing apparatus according to claim 10, further comprising:

a color palette memory having a plurality of color palettes; and palette referring means for reading said color information of said object from said plurality of color palettes based on a given color code, the read color information being then outputted therefrom toward said shading computation means;

wherein back color information is set for each of said plurality of color palettes; and wherein said depth cueing computation means performs said depth cueing computation based on said depth information, said color information and said back color information.

13. The image synthesizing apparatus according to claim 10, further comprising a field buffer unit for storing information including at least one of said color information of said object, information used to generate said color information, brightness information and depth information in a storage area corresponding to each pixel in said display, wherein said spotlight information generating means outputs at least one of said spotlight information for brightness and said spotlight information for depth for each pixel in synchronization with a timing at which said stored information for each pixel is outputted from said field buffer unit and also generates character screen information for displaying a character image on said display.

14. An image synthesizing method of displaying an image of a display by perspectively transforming a three-dimensional object onto a view screen of a view coordinate system, said method comprising the steps of:

generating a spotlight information for brightness for performing a spotlight display;

converting brightness information by using said spotlight information for brightness;

determining color information to be displayed on said display at each pixel by using the converted brightness information and color information of an object to determine color information to be displayed on said display at each pixel;

performing a depth cueing computation relative to said color information based on depth information; and generating spotlight information for depth for performing a spotlight display, and converting said depth information by using said spotlight information for depth.

15. An image synthesizing method of displaying an image on a display by perspectively transforming a three-dimensional object onto a view screen of a view coordinate system, said method comprising the steps of:

generating spotlight information for depth for performing a spotlight display;

converting depth information by using said spotlight information for depth;

determining color information to be displayed on said display for each pixel by using brightness information and color information of an object; and performing depth cueing computation relative to said color information by using the converted depth information.

* * * * *